US012785060B2

(12) United States Patent
Cotte et al.

(10) Patent No.: US 12,785,060 B2
(45) Date of Patent: Nov. 3, 2026

(54) SOLVENT-FREE CATHODE FOR LITHIUM-ION SECONDARY BATTERY

(71) Applicant: Toyota Motor Europe, Brussels (BE)

(72) Inventors: Stéphane Cotte, Brussels (BE); Masashi Ueda, Brussels (BE); Laurent Castro, Brussels (BE)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 704 days.

(21) Appl. No.: 18/266,723

(22) PCT Filed: Dec. 14, 2020

(86) PCT No.: PCT/EP2020/085963
§ 371 (c)(1),
(2) Date: Jun. 12, 2023

(87) PCT Pub. No.: WO2022/128053
PCT Pub. Date: Jun. 23, 2022

(65) Prior Publication Data
US 2024/0079546 A1 Mar. 7, 2024

(51) Int. Cl.
*H01M 4/04* (2006.01)
*H01M 4/02* (2006.01)
(Continued)

(52) U.S. Cl.
CPC ....... *H01M 4/0404* (2013.01); *H01M 4/0435* (2013.01); *H01M 4/0466* (2013.01);
(Continued)

(58) Field of Classification Search
CPC ............. H01M 4/0404; H01M 4/0435; H01M 4/0466; H01M 4/623; H01M 4/139;
(Continued)

(56) References Cited

U.S. PATENT DOCUMENTS

2014/0342223 A1* 11/2014 Voelker ............... H01M 4/0404 429/217
2017/0040591 A1* 2/2017 Nakano ............... H01M 4/0404
(Continued)

FOREIGN PATENT DOCUMENTS

JP 2006-210208 A 8/2006

OTHER PUBLICATIONS

Nakata et al. (WO-2020148912-A1) (Year: 2020).*
International Search Report dated Oct. 12, 2021; International Application No. PCT/EP2020/085963.

*Primary Examiner* — Galen H Hauth
*Assistant Examiner* — Hunsuyador Mugeesatu Yusif
(74) *Attorney, Agent, or Firm* — Dinsmore & Shohl LLP

(57) ABSTRACT

Method (100) for making a cathode for secondary battery, including mixing (102) an active material and a conductive material with an electron beam curable pre-polymer so as to obtain a solvent-free mixture made of the active material, the conductive material and the pre-polymer, passing the solvent-free mixture in a Moisture Powder Sheeting device, polymerizing (108) the pre-polymer with an electron beam so as to obtain a polymerized active layer on the metallic foil, pressing (110) the polymerized active layer on the metallic foil at room temperature so as to increase the density of the polymer active layer.
A composition for making a cathode for secondary battery, the composition including an active material, a conductive material and an electron beam curable pre-polymer, the composition being solvent-free. A cathode made from the composition and a secondary battery including the cathode.

3 Claims, 2 Drawing Sheets

(51) Int. Cl.
*H01M 4/62* (2006.01)
*H01M 4/13* (2010.01)
*H01M 4/139* (2010.01)

(52) U.S. Cl.
CPC ...... *H01M 4/623* (2013.01); *H01M 2004/028* (2013.01); *H01M 4/13* (2013.01); *H01M 4/139* (2013.01)

(58) Field of Classification Search
CPC ...... H01M 4/13; H01M 4/622; H01M 4/0416; H01M 2004/028; Y02E 60/10
See application file for complete search history.

(56) References Cited

U.S. PATENT DOCUMENTS

| | | | | |
|---|---|---|---|---|
| 2017/0098818 | A1* | 4/2017 | Cheng | H01M 4/662 |
| 2018/0323422 | A1* | 11/2018 | Du | H01M 4/0404 |
| 2019/0214627 | A1* | 7/2019 | Tan | C23C 14/35 |

* cited by examiner

SOLVENT-FREE CATHODE FOR LITHIUM-ION SECONDARY BATTERY

CROSS-REFERENCE TO RELATED APPLICATION

This application is a National Stage Entry under 35 U.S.C. § 371 of International Application No. PCT/EP2020/085963, filed on Dec. 14, 2020, the entire contents of which are herein incorporated by reference.

TECHNICAL FIELD

The present disclosure is related to a cathode for secondary battery, and more particularly to a cathode for a lithium-ion secondary battery.

BACKGROUND

Cathode for secondary batteries may be produced using a Moisture Powder Sheeting method, hereafter referred to as MPS. The concept is to use a 3-roll mill to make the coating of cathode material on either aluminium or copper. The main advantage of this process is that it allows to process powder with a very low content of solvent, generally between 15-20% wt. In the MPS method, the first step consists in mixing the dry powder with the solvent. Due to the low solvent quantity, the mixture does not form a homogeneous smooth paste.

Generally, N-Methyl-2-Pyrolidone, hereafter referred to as NMP, is used as the solvent. However, for environmental performance improvement, NMP being a toxic substances, and for decreasing the energy consumption of the cathode forming process, alternative to NMP are being sought.

Water has been tested instead of NMP. However, the active material may react with the water and a resistive layer may be formed on the active material, thus decreasing the performances of the cathode.

SUMMARY

Therefore, according to embodiments of the present disclosure, a method for making a cathode for secondary battery is provided. The method includes:

- mixing an active material and a conductive material with an electron beam curable pre-polymer so as to obtain a solvent-free mixture made of the active material, the conductive material and the pre-polymer;
- passing the solvent-free mixture between a first roll and a second roll, so as to apply a layer of the solvent-free mixture on the second roll;
- passing the layer of the solvent-free mixture between the second roll and a third roll carrying a metallic foil so as to transfer the layer of the solvent-free mixture onto the metallic foil;
- polymerizing the pre-polymer with an electron beam so as to obtain a polymerized active layer on the metallic foil;
- pressing the polymerized active layer on the metallic foil at room temperature so as to increase the density of the polymer active layer;
- cutting the metallic foil so as to obtain the cathode.

By providing such a method, it is possible to produce a cathode without use of NMP. Moreover, the cathode production is solvent-free, i.e., there is no step in the production method for removing the solvent. As the removal of the solvent is generally made at temperature above ambient temperature, the method of the present disclosure allows for reducing the energy consumption.

By pre-polymer, a mixture of monomers that will form the polymer after irradiation with electron beam is intended.

Non-limiting examples of metallic foils are aluminium foils, copper foils.

As a non-limiting example, the pressing step may be carried out at 0.5 ton/cm (ton per centimetre).

The increase of density of the polymer active layer allows for reducing the IV resistance.

The active material, the conductive material and the electron beam curable pre-polymer are mixed together. No premixing of the active material and the conductive material is requested.

It is understood that during the cutting of the metallic foil, the polymerized active layer is also cut.

As a non-limiting example, the absorbed dose may be of 60 kGy (kilo Gray).

As a non-limiting example, the metallic foil may have a speed equal to or smaller than 10 m/s (meter per second).

In some embodiments, the total content of active material in the solvent-free mixture may be equal to or larger than 80% in mass, equal to or larger than 85% in mass, or equal to or larger than 90% in mass.

In some embodiments, the pre-polymer may include acrylate.

Non-limiting examples of acrylates may be aliphatic urethane acrylate, epoxy acrylate, methacrylate or ester acrylate.

In some embodiments, the pre-polymer may include methacrylate.

In some embodiments, the pre-polymer may include methacrylate and a lithiated monomer having an acrylate function.

Lithiated monomer having an acrylate function allows further reducing the IV resistance by providing lithium in the cathode.

In some embodiments, the pre-polymer may consist of methacrylate and a lithiated monomer having an acrylate function.

In some embodiments, the lithiated monomer having an acrylate function may be lithium bis-(trilfluoromethylsulfonyl)amine methacrylate.

In some embodiments, the content of lithium bis-(trilfluoromethylsulfonyl)amine methacrylate in the pre-polymer may be equal to or smaller than 20% in mass.

In some embodiments, the active material may be a lithium-containing complex oxide.

Non-limiting examples of lithium-containing complex oxide active material are $LiCoO_2$, $LiMnO_2$, $LiMn_2O_4$, $LiNiO_2$, $LiNi_xCo_{(1-x)}O_2$, $LiNi_xCo_yMn_{(1-x-y)}O_2$ ($0<x<1$ and $0<y<1$), $Li_2Mn_3NiO_8$, $LiNiCoMnO_2$.

In some embodiments, the conductive material may be carbon.

Non-limiting examples of carbon conductive material are acetylene black, Ketjen black.

The present disclosure also relates to a composition for making a cathode for secondary battery, the composition including an active material, a conductive material and an electron beam curable pre-polymer, the composition being solvent-free.

In some embodiments, the total content of active material in the solvent-free mixture may be equal to or larger than 80% in mass, equal to or larger than 85% in mass, or equal to or larger than 90% in mass.

In some embodiments, the active material may be a lithium-containing complex oxide.

Non-limiting examples of lithium-containing complex oxide active material are $LiCoO_2$, $LiMnO_2$, $LiMn_2O_4$, $LiNiO_2$, $LiNi_xCo_{(1-x)}O_2$, $LiNi_xCo_yMn_{(1-x-y)}O_2$ ($0<x<1$ and $0<y<1$), $Li_2Mn_3NiO_8$, $LiNiCoMnO_2$.

In some embodiments, the pre-polymer may include acrylate.

Non-limiting examples of acrylates may be aliphatic urethane acrylate, epoxy acrylate, methacrylate or ester acrylate.

In some embodiments, the pre-polymer may include methacrylate.

In some embodiments, the pre-polymer may include methacrylate and a lithiated monomer having an acrylate function.

In some embodiments, the pre-polymer may consist of methacrylate and a lithiated monomer having an acrylate function.

In some embodiments, the lithiated monomer having an acrylate function may be lithium bis-(trilfluoromethylsulfonyl)amine methacrylate.

In some embodiments, the content of lithium bis-(trilfluoromethylsulfonyl)amine methacrylate in the pre-polymer may be equal to or smaller than 20% in mass.

In some embodiments, the conductive material may be carbon.

Non-limiting examples of carbon conductive material are acetylene black, Ketjen black.

The present disclosure relates to a cathode for secondary battery made from the above-described composition by the above-described method.

The present disclosure relates to a secondary battery including the above-described cathode.

It is intended that combinations of the above-described elements and those within the specification may be made, except where otherwise contradictory.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, serve to explain the principles thereof.

DETAILED DESCRIPTION

Reference will now be made in detail to exemplary embodiments of the disclosure, examples of which are illustrated in the accompanying drawings. Wherever possible, the same reference numbers will be used throughout the drawings to refer to the same or like parts.

Figure 1:
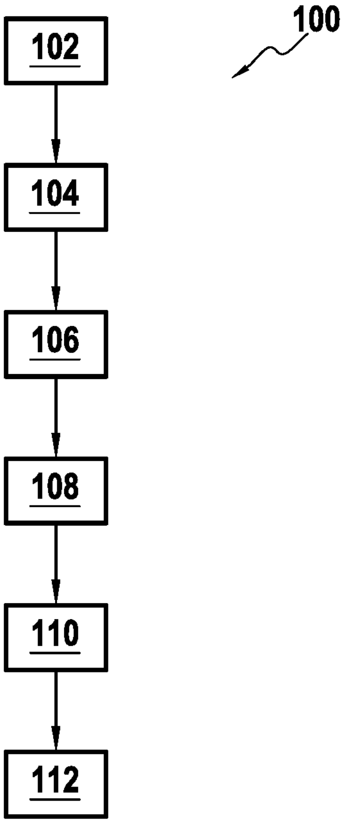
FIG. 1 shows a flow chart of the method according to embodiments of the present disclosure.

FIG. 1 shows a flow chart of a method 100 for making a cathode 30 for secondary battery according to embodiments of the present disclosure.

During a mixing step 102, an active material and a conductive material with an electron beam curable pre-polymer are mixed so as to obtain a solvent-free mixture 20 made of the active material, the conductive material and the pre-polymer.

Figure 2:
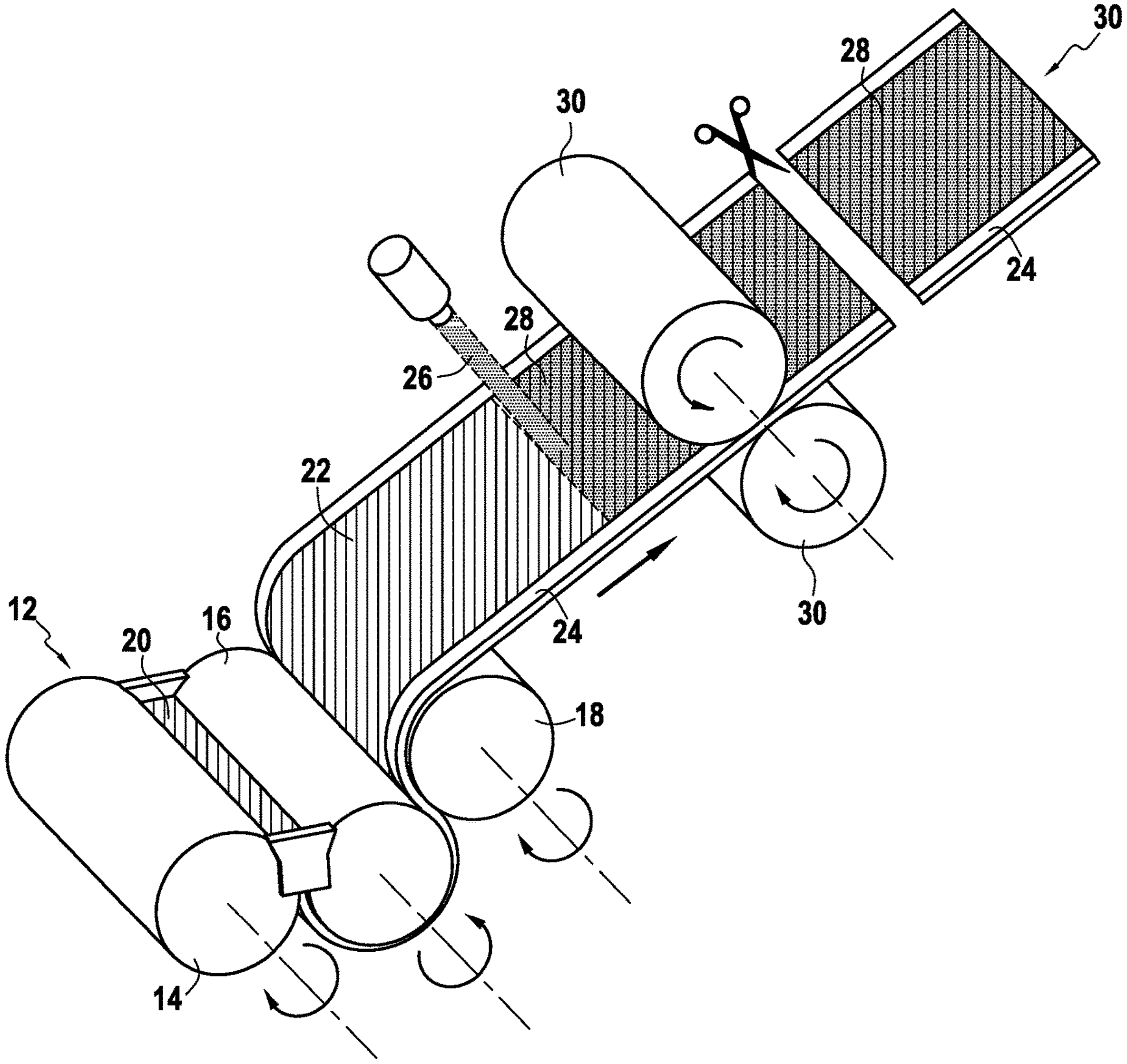
FIG. 2 shows a Moisture Powder Sheeting device.

The solvent-free mixture 20 is then passed in a Moisture Powder Sheeting (MPS) device 12, as illustrated on FIG. 2.

The MPS device 12 comprises three rolls, a first roll 14, a second roll 16 and a third roll 18, the second roll 16 being disposed between the first roll 14 and the third roll 18. The first roll 14 has a speed V1, the second roll 16 has a speed V2 and the third roll 18 has a third speed V3, where V1<V2<V3.

During a first passing step 104, the solvent-free mixture 20 passes between the first roll 14 and the second roll 16, so as to apply a layer 22 of the solvent-free mixture 20 on the second roll 16.

During a second passing step 106, the layer 22 of the solvent-free mixture 20 passes between the second roll 16 and the third roll 18 carrying a metallic foil 24 so as to transfer the layer 22 of solvent-free mixture 20 onto the metallic foil 24.

During a polymerizing step 108, the pre-polymer is polymerized with an electron beam 26 so as to obtain a polymerized active layer 28 on the metallic foil 24.

During a pressing step 110, the polymerized active layer on the metallic foil is pressed at room temperature, for example between two rolls 30, so as to increase the density of the polymer active layer.

During a cutting step 112, the metallic foil 24 is cut so as to obtain the cathode 30.

Example 1

In Example 1, in the mixing step 102, the active material is $LiNi_{1/3}Co_{1/3}Mn_{1/3}O_2$, the conductive material is acetylene black and the pre-polymer is methacrylate (EBECRYL 151, Allnex®). The active material, the conductive material and the pre-polymer are mixed together so as to obtain a solvent-free mixture 20. The content of active material is 90% in mass and the content of conductive material is 3% in mass and the content of pre-polymer is 7% in mass.

The mixing step 102 is carried out in a mixer (mixing device), for example a domestic food processor of impeller radius 80 mm (millimetre) and 3 L (litre) bowl capacity. The two diametrically opposing blades were offset from each other by a vertical distance of approximately 16 mm. The mixer was operated at a constant speed of 1650 rpm (round per minute), which corresponded to a blade tip velocity of 13.8 m/s (meter per second). The mixing step 102 is carried out for 10 minutes.

The solvent-free mixture 20 is then passed in the Moisture Powder Sheeting (MPS) device 12, as illustrated on FIG. 2.

In the first passing step 104, the solvent-free mixture 20 pass between the first roll 14 and the second roll 16, so as to apply a layer 22 of the solvent-free mixture on the second roll 14.

During the second passing step 106, the layer 22 of the solvent-free mixture 20 passes between the second roll 16 and the third roll 18 carrying a metallic foil 24 so as to transfer the layer 22 of solvent-free mixture 20 onto the metallic foil 24. The metallic foil 24 may have a speed of 10 m/s.

In this example, the metallic foil 24 may be an aluminium foil having a thickness of 12 μm (micrometre).

During the polymerizing step 108, the pre-polymer is polymerized with an electron beam 26 so as to obtain a polymerized active layer 28 on the metallic foil 24. The absorbed dose is equal to 60 kGy. The absorbed dose is monitored through exposing time, exposed area, voltage of the machine and current.

During the pressing step 110, the polymerized active layer 28 on the metallic foil 24 is pressed, for example between two rolls 30, so as to increase the density of the polymer active layer.

Before pressing, the polymerized active layer 28 has a density equal to 1.67 $g/cm^3$ (gram per cubic centimetre) and after pressing with the two rolls at a pressure of 0.5 ton/cm at room temperature, the polymerized active layer 28 has a density equal to 2.63 $g/cm^3$.

During the cutting step 112, the metallic foil 24 and polymerized active layer 28 are cut so as to obtain the cathode 30.

Other non-limiting examples of electron beam curable pre-polymer are aliphatic urethane acrylate (Genomer 4212, Rahn®) and ester acylate (DSM, Agisyn®).

Example 2

The same method for making Example 1 has been used for making Example 2.

The active material is $LiNi_{1/3}Co_{1/3}Mn_{1/3}O_2$, the conductive material is acetylene black, the electron beam curable pre-polymer is a mix of methacrylate and lithium bis-(trilfluoromethylsulfonyl)amine methacrylate (LiMTFSI).

The content of active material is 90% in mass and the content of conductive material is 3% in mass and the content of pre-polymer is 7% in mass. The content of LiMTFSI in the pre-polymer is 10% in mass.

Example 3

Example 3 is similar to Example 2, the difference being the content of LiMTFSI in the pre-polymer, which is 15% in mass.

Example 4

Example 4 is similar to Example 2, the difference being the content of LiMTFSI in the pre-polymer, which is 20% in mass.

IV Resistance

A test cell is used to measure the IV resistance (internal resistance) of a battery cell comprising the cathode 30.

In the test cell, the anode is made of graphite 98.8% in mass as active material with styrene butadiene rubber 0.7% in mass and carboxymethyl cellulose 0.5% in mass as binder.

In the test cell, the separator is of the polyethylene film type and the electrolyte is EC:DMC (1:1 volume ratio) with LiPF6 at 1 mol/L (mole per litre).

The IV resistance is measured as follows. The charging equipment for the battery cell is used, such as the TOSCAT-3300K (TOYO System Co). The temperature is set to 25° C., the state of charge (SOC) of the battery cell is set to 60%.

Charging/discharging of the cell is as follows:

discharge at 0.33C in 10 s and charge at 0.33C in 10 s;
discharge at 1C in 10 s and charge at 0.33C in 30 s;
discharge at 3C in 10 s and charge at 0.33C in 90 s;
discharge at 5C in 10 s and charge at 0.33C in 150 s;
discharge at 8C in 10 s and charge at 0.33C in 240 s.

Between each discharge/charge cycle, there is a rest for 10 minutes before the next step.

The voltage drop during each discharge is measured and the average IV resistance can be calculated from the voltage drop.

For Examples 1 to 5, the IV resistance is given in Table 1 below.

TABLE 1

| | IV resistance (in Ω) |
|---|---|
| Example 1 | 4.25 |
| Example 2 | 4.10 |
| Example 3 | 4.09 |
| Example 4 | 3.82 |

As may be seen in Table 1, with methacrylate only or a mix of methacrylate and LiMTFSI up to 20% in mass in the pre-polymer, the internal resistance is reduced down to 3.82Ω. The lower the IV resistance, the better the cathode 30.

Throughout the description, including the claims, the term “comprising a” should be understood as being synonymous with “comprising at least one” unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms “substantially” and/or “approximately” and/or “generally” should be understood to mean falling within such accepted tolerances.

Where any standards of national, international, or other standards body are referenced (e.g., ISO, etc.), such references are intended to refer to the standard as defined by the national or international standards body as of the priority date of the present specification. Any subsequent substantive changes to such standards are not intended to modify the scope and/or definitions of the present disclosure and/or claims.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The invention claimed is:

1. A method for making a cathode for secondary battery, comprising:

mixing an active material and a conductive material with an electron beam curable pre-polymer so as to obtain a solvent-free mixture made of the active material, the conductive material and the pre-polymer, wherein the pre-polymer comprises methacrylate and a lithiated monomer having an acrylate function, wherein the lithiated monomer having the acrylate function is lithium bis-(trifluoromethylsulfonyl)amine methacrylate;

passing the solvent-free mixture between a first roll and a second roll, so as to apply a layer of the solvent-free mixture on the second roll;

passing the layer of the solvent-free mixture between the second roll and a third roll carrying a metallic foil so as to transfer the layer of the solvent-free mixture onto the metallic foil;

polymerizing the pre-polymer with an electron beam so as to obtain a polymerized active layer on the metallic foil;

pressing the polymerized active layer on the metallic foil at room temperature so as to increase the density of the polymer active layer;

cutting the metallic foil so as to obtain the cathode.

2. The method according to claim 1, wherein the total content of active material in the solvent-free mixture is equal to or larger than 80% in mass.

3. The method according to claim 1, wherein the content of lithium bis-(trifluoromethylsulfonyl)amine methacrylate in the pre-polymer is equal to or smaller than 20% in mass.

* * * * *